June 1, 1948.　　　G. R. GREENSLADE　　　2,442,355
GALVANOMETER MOUNTING

Filed Sept. 6, 1944　　　3 Sheets-Sheet 1

INVENTOR
Grover R. Greenslade
by his attorneys

June 1, 1948. G. R. GREENSLADE 2,442,355
GALVANOMETER MOUNTING

Filed Sept. 6, 1944 3 Sheets-Sheet 2

INVENTOR
Grover R. Greenslade
by his attorneys
Christy, Parmelee Strickland

June 1, 1948.  G. R. GREENSLADE  2,442,355
GALVANOMETER MOUNTING

Filed Sept. 6, 1944  3 Sheets-Sheet 3

INVENTOR
Grover R. Greenslade
by his attorney
Christy, Parmelee, Strickland

Patented June 1, 1948

2,442,355

UNITED STATES PATENT OFFICE 2,442,355

GALVANOMETER MOUNTING

Grover R. Greenslade, Scott Township, Allegheny County, Pa., assignor to Flannery Bolt Company, Bridgeville, Pa., a corporation of Delaware Application September 6, 1944, Serial No. 552,847

7 Claims. (Cl. 248—18)

This invention relates to a mounting for precision instruments, especially a precision galvanometer, and provides a mounting for such instrument which is portable, or which is to be used in the neighborhood of vibration producing equipment, and provides an instrument support in which the instrument is unaffected by such local conditions.

In my United States Patent No. 2,326,352, granted August 10, 1943, there is disclosed an electric testing apparatus and method wherein metal parts to be tested are connected into a specially developed bridge circuit and their resistance is measured. By measuring the same part from time to time, an increase in electrical resistance may be indicative of a fracture or incipient fracture. Defective parts may thus be detected and removed before damage has been done. The invention therein disclosed was primarily developed for the purpose of detecting failure of locomotive parts, especially drive pins, before they failed in service, but the invention is of course not restricted to such field of use.

Tests of this character are frequently run in roundhouses, repair shops, sidings, or the like, where mechanical vibration, due to the operation of heavy machinery or movement of railway rolling stock, may disturb the delicate galvanometer to an extent such as to render careful reading of the galvanometer extremely difficult.

Moreover, the equipment should be, in many cases at least portable.

The present invention provides a galvanometer support and housing which may be used in either fixed or portable installations, and is especially applicable to the portable ones. With this mounting, the galvanometer may be readily held or clamped in a fixed position in the casing when the galvanometer is not in use. However, when the galvanometer is to be used, such clamping means may be released and the galvanometer will be suspended inside the casing in which it is mounted from a plurality of springs, its only support when so suspended being through the springs, whereby vibration will not be effectively transmitted to it. Additionally, the galvanometer is mounted on a heavy base to which the springs through which it is suspended are attached. The mass and inertia of the base tend to dampen vibrations and slight movements which otherwise might affect the instrument. Provision is also made for damping the springs whereby the swaying of the instrument, or the heavy base on which it is mounted, is prevented, and vibration in the springs themselves are damped.

My invention may be more fully understood by reference to the accompanying drawings, in which.

Figure 1:
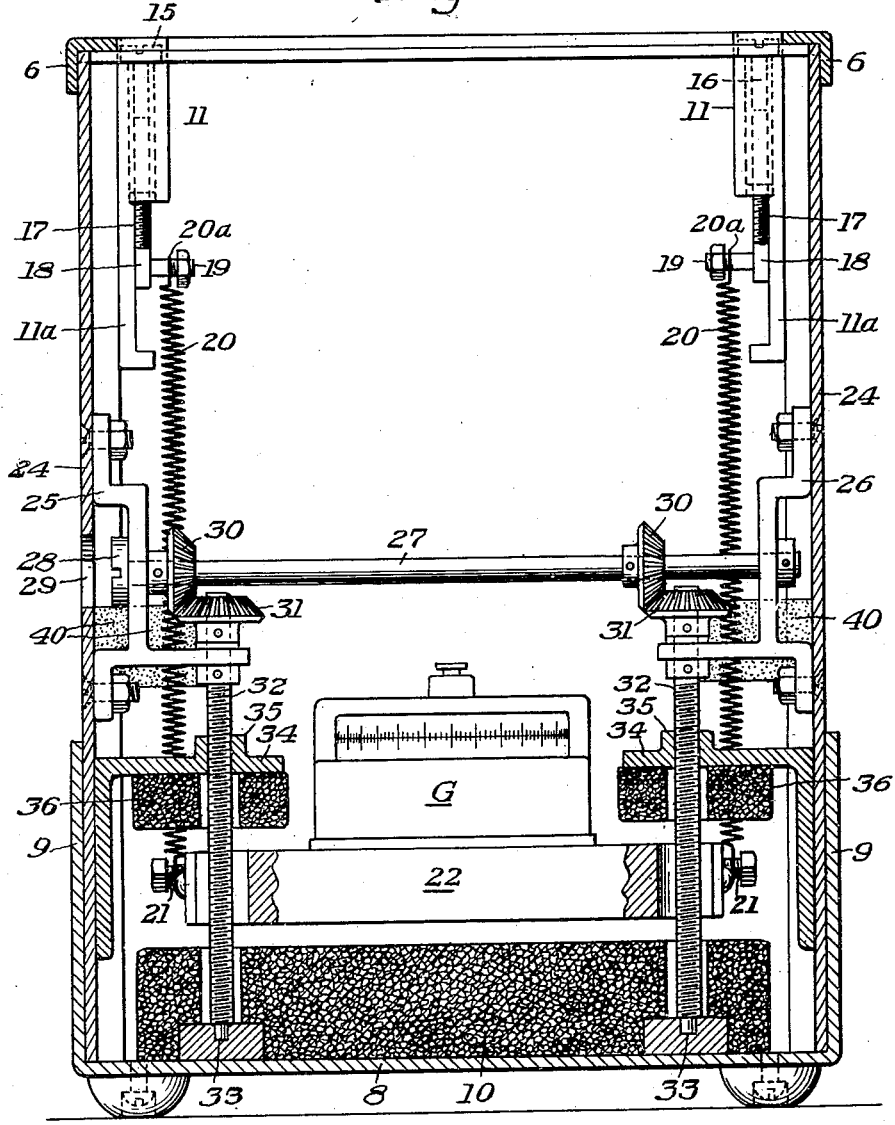
Figure 1 is a transverse vertical section through the housing and mounting, the instrument itself and the base on which it is carried being in elevation.
Figure 2:
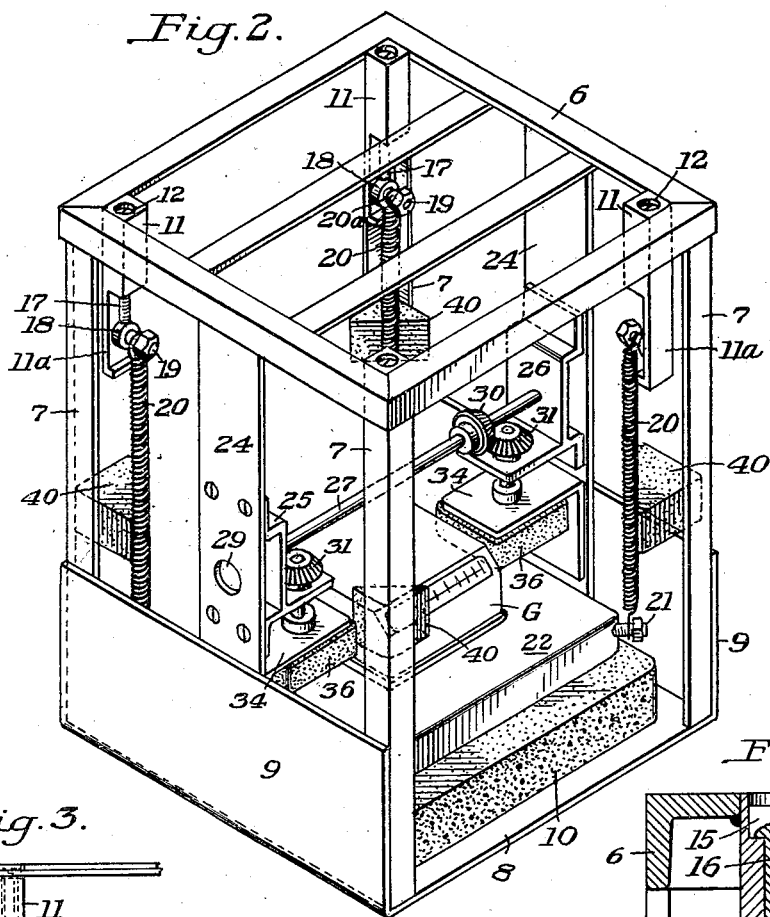
Figure 2 is a perspective view with the cover of the housing removed.

Referring to the drawings, there is an instrument case designated generally as 2, with a carrying strap or handle 3 at the top thereof, and a window 4 through which the galvanometer may be viewed. The case is built up over a metal frame comprising a rectangular top 6 formed of angle iron with angle iron corner posts 7 at each corner thereof. At the bottom of the frame is a sheet metal plate 8 having a flange 9 at each side thereof, which extends up the side of the frame.

The casing may be covered with leather or other material resembling somewhat a piece of luggage.

Resting on the bottom 8, and secured thereto, is a thick block or cushion 10, preferably formed of foam rubber.

Figure 4:
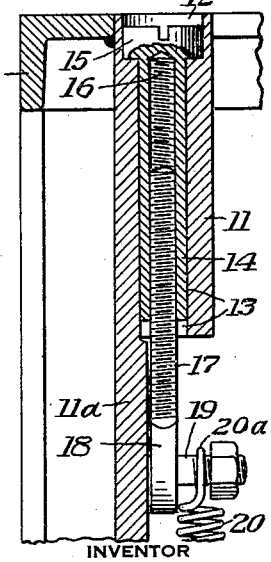
Figure 4 is a fragmentary sectional view of one of the spring supports in the top of the housing.
Figure 5:
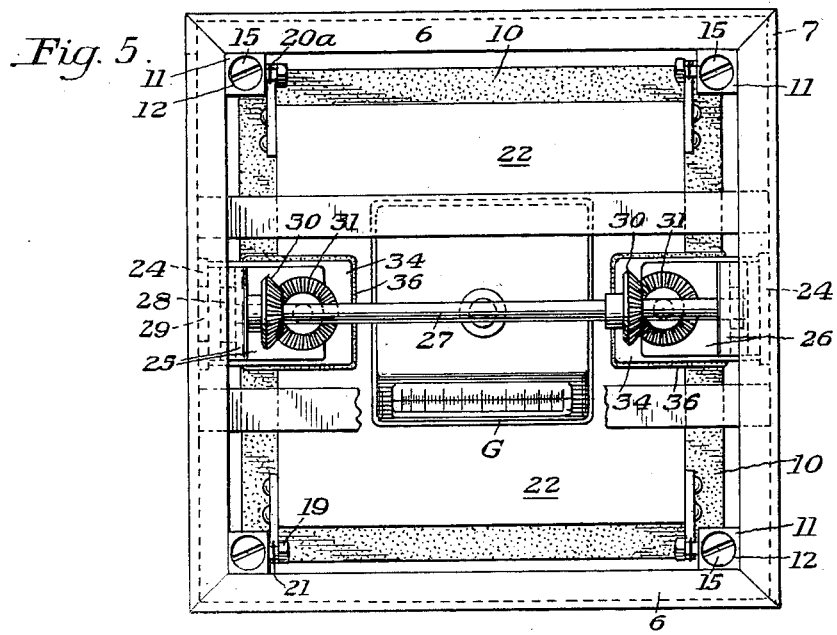
Figure 5 is a top plan view with the cover removed.
Figure 6:
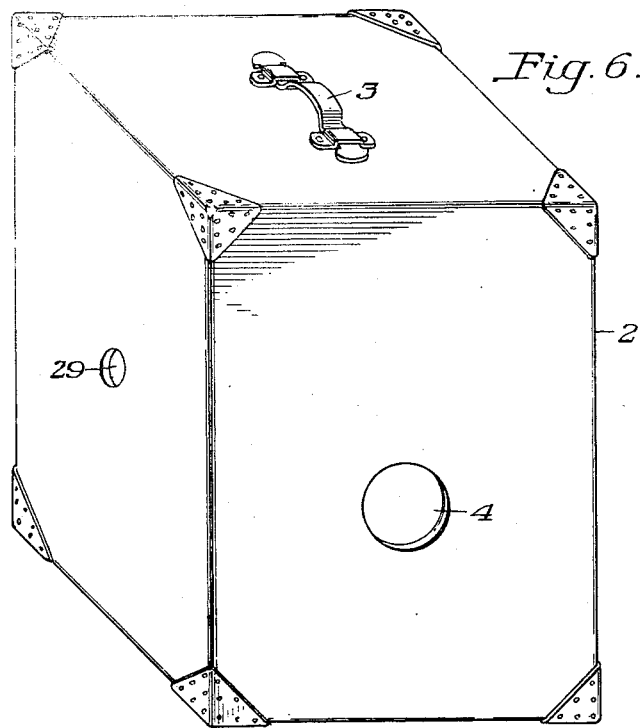
Figure 6 is a perspective view of the assembled case.

In each corner of the top of the frame there is welded or otherwise secured, a vertically disposed guide member 11 which has a recess 12 (see Fig. 4) in the top thereof, and in which there is a vertical opening 13. The guide or sleeve 11 is provided with a downwardly extending extension 11a. Set in the opening 13 is a sleeve member 14 having a head 15 and an internally threaded bore 16. A bolt 17 is threaded into the opening 16 and has a head portion 18 at its lowermost end which carries a threaded stud 19. The head 18 is flat against the extension 11a so that the bolt 17 may not turn. The head 15 on top of the sleeve 14 is slotted for engagement by a screw driver. By turning the sleeve 14 in one direction or the other, the bolt 17 which telescopes into it may be raised or lowered.

As heretofore stated, there is one of these adjustable fixtures in each corner of the top of the frame. Each stud 19 has the eye portion 20a of a tension spring 20 looped over and a nut on the stud serves to keep the spring from sliding off the stud. Thus there is provided a long tension spring in each corner of the frame and the effective lengths of these springs can be adjusted by the adjustable fixture including the telescoping parts above described.

Each of the springs 20 has its lower end engaged over a stud 21 on a heavy metal block 22 positioned within the frame above the cushion 10. On the block 22 is secured the instrument, such as a galvanometer, which may be of any known or preferred construction, and which is designated as G, the galvanometer being more or less conventionally illustrated.

The tension on the springs 20 is such that the blocks 22 will normally be lifted above the cushion base 10 and will hang freely suspended from the four springs. By adjusting the springs in each corner, the proper conditions of tension and the proper leveling of the galvanometer can be attained. The top of the casing is provided with openings through which the screw slots in the heads 15 are accessible.

On each of the two opposite sides of the frame are metal plates 24. These plates are provided with brackets 25 and 26 to support a transverse shaft 27 that extends across the width of the frame above the instrument or galvanometer. The shaft 27 has a head 28 on one end, this head being provided with a kerf and in the casing is an opening 29 so that a screw driver may be inserted to engage the kerf and rotate the shaft 27. The shaft 27 is provided with two beveled gears 30. These beveled gears engage pinions 31 on the upper ends of the vertical shafts 32, which shafts are also supported in the brackets 25 and 26 respectively, and which have their lower ends positioned in socket bearings 33 on the base 8. Thus by turning the shaft 27, both vertical screw shafts 32 may be simultaneously rotated.

Threaded on each shaft 32 is a clamping element 34 which has a sleeve 35 through which the threaded shaft 32 passes, and which is internally threaded to engage the shaft. Each clamping element 34 has a sponge rubber pad 36 on its lower face. Each of the clamping elements also has a downwardly depending wing or extension 37 that rests against the inside of the metal flange 9. The clamping elements are positioned to overhang the heavy metal block 22.

Figure 3:
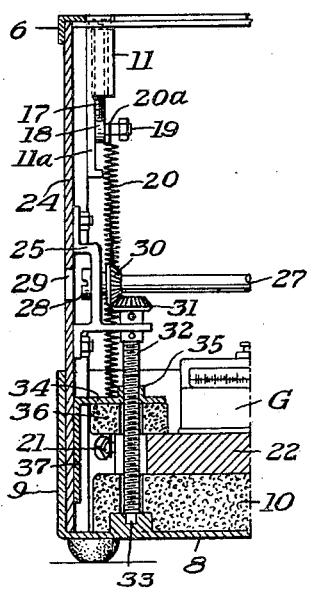
Figure 3 is a fragmentary vertical section showing one of the clamping elements moved down.

In the operation of the clamps, the shaft 27 is turned to simultaneously move the clamps from the position shown in Figure 1 downwardly to the position shown in Figure 3. The clamps moving down bear against the supporting base 22, pushing the base 22 down against the cushion 10 and clamping it in that position. With the base 22 pushed down, or clamped in this way, the galvanometer is firmly held in the casing and can be safely and conveniently transported without swinging or banging about in the casing. However, when it is desired to use the galvanometer, the shaft 27 is turned in the reverse direction until the clamping elements 34 are entirely clear of the supporting block 22. The tension springs 20 serve to lift the galvanometer and its base to the normal operating position, in which position it hangs, as above mentioned, in suspension on the four corner springs.

In order to prevent the galvanometer and its base from swinging and dampen vibration in each of the springs 20, a block of sponge rubber 40 is secured in each of the corner posts in a position where it bears against the adjacent spring intermediate the ends of the spring. The blocks of rubber serve to dampen vibration in the springs, and at the same time, keep the structure from swinging.

Extensive tests with the galvanometer as thus constructed and housed show that it may be used satisfactorily for making very delicate measurements in buildings where there is excessive vibration or in which heavy machinery, such as destructive testing devices, are in constant operation. The invention provides a relatively simple and cheap mounting for a galvanometer, one which adapts itself specially to portable units and one in which the galvanometer itself is quite secure against accident.

While the invention has been herein specifically described as a galvanometer mounting, it is apparent that it may be used for other precision instruments such as volt or wattmeters, pyrometers or the like, and reference to a galvanometer is by way of illustration of a utility to which the invention has been specifically adapted.

While I have illustrated and described a particular embodiment of my invention, it will be understood that this is by way of illustration, and that various changes and modifications may be made within the contemplation of my invention and under the scope of the following claims.

I claim:

1. A measuring device of the class described, comprising a massive base block having a measuring instrument thereon, a frame in which the base block is free to move vertically, springs attached to the block and suspended from the frame by means of which the block is suspended, a plurality of holding means in the frame movable into and out of block-engaging position for releasably clamping the block to the frame, and means for simultaneously operating all of the said holding means.

2. A measuring device of the class described, comprising a massive heavy metal base block having a measuring instrument thereon, a frame in which the base block is free to move vertically and in which the block is horizontal, springs attached to the block at its several corners and suspended from the frame by means of which the block is suspended, and means for individually adjusting the tension of each of said springs, and spongy resilient means supported by said frame at said several corners so as to engage said springs intermediate their ends for damping vibrations in the springs and restraining them from swinging.

3. A galvanometer mounting of the class described comprising a massive base block formed of metal on which the galvanometer is adapted to be mounted, a frame structure, a plurality of springs attached at their lower ends to the block and at their upper ends to the frame by means of which the block is resiliently suspended, a cushion under the block, and clamping means engageable with said block at a plurality of points for releasably holding the block on the cushion, and means for simultaneously operating said clamping means so as to move into and out of engagement at all of said points of the block simultaneously.

4. An instrument mounting and housing comprising a casing, a heavy metal block suspended from tension springs inside the casing and adapted to support a measuring instrument, a pad under said block and normally spaced therefrom, vertically moving clamping elements over the block for releasably pressing and holding the block against said pad, and means for simultaneously operating the clamping elements.

5. An instrument mounting and housing comprising a casing, a heavy metal block suspended from tension springs inside the casing and adapted to support a measuring instrument, a pad under said block and normally spaced therefrom, vertically moving clamping elements over the block for releasably pressing and holding the block against said pad, and means accessible from the exterior of the casing mechanically and operatively connected with said last named means for operating the same.

6. An instrument mounting of the class described comprising a casing, a heavy block within the casing on which an instrument is adapted to be mounted, a plurality of vertically adjustable supports in the top of the casing, tension springs by means of which the block is suspended from the top of the casing, which springs are connected with said adjustable supports and with the block, said adjustable means being accessible for adjustment from the exterior of the casing and comprising screw elements with which the supports are engaged for relative rotation and resilient means supported on the interior walls of said casing and engageable with said springs intermediate their lengths for damping vibrations in the springs and restraining them from swinging between the screw elements and the supports.

7. An instrument mounting of the class described comprising a casing, a heavy block within the casing on which an instrument is adapted to be mounted, a plurality of vertically adjustable supports in the top of the casing, tension springs by means of which the block is suspended from the top of the casing, which springs are connected with said adjustable supports and with the block, a cushion under said block, a plurality of clamping means movable vertically over the block for depressing the block against the tension of the springs onto the cushion, and means accessible from the exterior of the casing for operating said clamping means in unison.

GROVER R. GREENSLADE.

REFERENCES CITED

The following references are of record in the file of this patent:

UNITED STATES PATENTS

| Number | Name | Date |
| --- | --- | --- |
| 1,243,358 | Stoddard | Oct. 16, 1917 |
| 1,364,860 | Betts | Jan. 11, 1921 |
| 1,880,280 | Replogle | Oct. 4, 1932 |
| 2,014,581 | Norton | Sept. 17, 1935 |
| 2,030,349 | Bradley | Feb. 11, 1936 |
| 2,311,396 | Judkins | Feb. 16, 1943 |